(12) United States Patent
Kondo et al.

(10) Patent No.: US 12,438,336 B2
(45) Date of Patent: Oct. 7, 2025

(54) PHOSPHOR ELEMENT, PHOSPHOR DEVICE, AND ILLUMINATION APPARATUS

(71) Applicant: NGK Insulators, Ltd., Nagoya (JP)

(72) Inventors: Jungo Kondo, Miyoshi (JP); Naotake Okada, Anjo (JP); Shoichiro Yamaguchi, Ichinomiya (JP); Tetsuya Ejiri, Kasugai (JP); Yuichi Iwata, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 716 days.

(21) Appl. No.: 17/663,846

(22) Filed: May 18, 2022

(65) Prior Publication Data
US 2022/0278506 A1  Sep. 1, 2022

Related U.S. Application Data

(63) Continuation of application No. PCT/JP2020/043620, filed on Nov. 24, 2020.

(30) Foreign Application Priority Data

Nov. 26, 2019 (JP) ................. 2019-213171

(51) Int. Cl.
*H01S 3/17* (2006.01)
*H01S 3/06* (2006.01)
(Continued)

(52) U.S. Cl.
CPC ............ *H01S 3/175* (2013.01); *H01S 3/0625* (2013.01); *H01S 5/02476* (2013.01); *H01S 5/0611* (2013.01); *H01S 5/18352* (2013.01)

(58) Field of Classification Search
CPC .... H01S 3/175; H01S 3/0625; H01S 5/02476; H01S 5/0611; H01S 5/18352;
(Continued)

(56) References Cited

U.S. PATENT DOCUMENTS

2019/0157521 A1*  5/2019  Harada ............... H10H 20/821
2021/0184425 A1*  6/2021  Kondo .................... F21V 29/86
2021/0215318 A1*  7/2021  Kondo ...................... F21V 7/26

FOREIGN PATENT DOCUMENTS

JP  2009-267040 A  11/2009
JP  2012-178395 A  9/2012
(Continued)

OTHER PUBLICATIONS

Machine translation of JP 2017076765 A (Year: 2017).*
(Continued)

*Primary Examiner* — Yuanda Zhang
(74) *Attorney, Agent, or Firm* — BURR PATENT LAW, PLLC

(57) ABSTRACT

A phosphor element includes an incident face for an excitation light, an emitting face opposing the incident face and a side face, and the element converts at least a part of the incident excitation light incident onto the incident face to fluorescence and emits the fluorescence from the emitting face. The emitting face has an area larger than an area of the incident face. The phosphor element comprises an inclination region in which an inclination angle of the side face with respect to a vertical axis perpendicular to the emitting face is monotonously increased from the incident face toward the emitting face, viewed in a cross-section perpendicular to the emitting face and along the longest dividing line halving the emitting face.

14 Claims, 12 Drawing Sheets

(51) Int. Cl.
*H01S 5/024* (2006.01)
*H01S 5/06* (2006.01)
*H01S 5/183* (2006.01)

(58) Field of Classification Search
CPC ..... G02B 19/0019; F21V 9/32; F21V 29/502; F21Y 2115/30
See application file for complete search history.

(56) References Cited

FOREIGN PATENT DOCUMENTS

| | | | |
|---|---|---|---|
| JP | 5679435 B2 | 3/2015 | |
| JP | 2017-076765 A | 4/2017 | |
| JP | 2017-085038 A | 5/2017 | |
| WO | 2013/175706 A1 | 11/2013 | |
| WO | WO-2018116525 A1 * | 6/2018 | ........... G02B 6/0003 |

OTHER PUBLICATIONS

Machine translation of WO 2018116525 A1 (Year: 2018).*
International Search Report and Written Opinion (Application No. PCT/JP2020/043620) dated Jan. 26, 2021 (with English translation).
English translation of International Preliminary Report on Patentability (Chapter I) (Application No. PCT/JP2020/043620) dated Jun. 9, 2022, 10 pages.

* cited by examiner

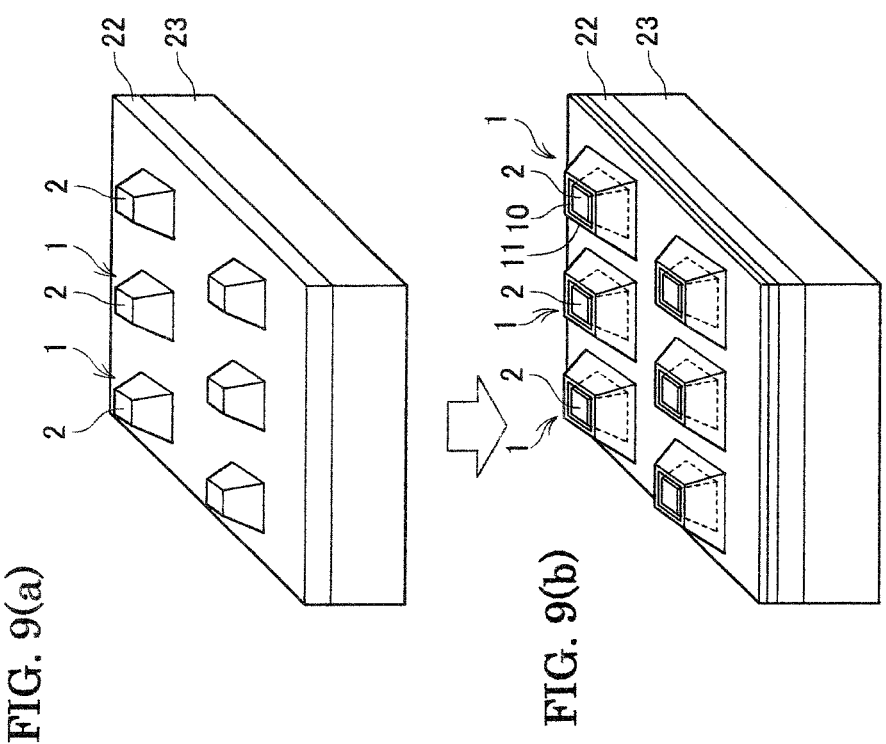

PHOSPHOR ELEMENT, PHOSPHOR DEVICE, AND ILLUMINATION APPARATUS

CROSS-REFERENCE TO RELATED APPLICATIONS

This application is a continuation application of PCT/JP2020/043620, filed Nov. 24, 2020, which claims priority to Japanese Application No. JP2019-213171 filed on Nov. 26, 2019, the entire contents all of which are incorporated hereby by reference.

TECHNICAL FIELD

The present invention is related to a phosphor element and illumination apparatus emitting fluorescence.

BACKGROUND ARTS

Recently, intensive study has been undertaken in headlights for a vehicle employing a laser light source, and one thereof is a white light source constructed by combining blue laser or ultraviolet laser and a phosphor. The optical density of excitation light can be increased by condensing laser light, and, moreover, a light intensity of the excitation light can also be increased by condensing multiple beams of laser light so as to overlap on the phosphor. As a result, light flux and brightness can simultaneously be increased without changing a light emission area. Therefore, a white light source that combines semiconductor laser and a phosphor with each other is attracting attention as a light source that replaces the LED. For example, as phosphor glass used for the vehicle headlight, phosphor glass "Lumiphous™" from Nippon Electric Glass and YAG monocrystal fluorescent bodies from National Institute for Materials Science, Tamura Corporation, and Koha Co., Ltd. are proposed.

According to a phosphor element described in patent document 1 (U.S. Pat. No. 5,679,435B), the width of the phosphor is made larger from an incident face to an emitting face. It is described that the inclination angle of the side face of the phosphor is made 15° or more and 35° or less. Then, the phosphor is contained in a resin case, and a metal film is formed so that the inner surface of the case is functioned as a reflector part. The phosphor is fixed on the bottom face of the case with a sealing resin, and the side face of the phosphor is covered with air.

According to a phosphor element described in patent document 2 (JP 2017-085038A), the width of the phosphor is increased from an incident face to an emitting face, the phosphor is contained in a through hole of a heat dissipation member, and a side face of the through hole is bonded with the surface of the through hole with glass paste.

According to patent document 3 (WO 2013/175706 A1), it is described a phosphor element produced by containing a phosphor in a through hole of a heat dissipating member and by fixing the phosphor in the through hole (FIGS. 15 to 18).

PATENT DOCUMENTS (Patent document 1) Japanese Patent No. 5679435B
(Patent document 2) Japanese Patent Publication No. 2017-085038A
(Patent document 3) WO 2013-175706 A1

SUMMARY OF THE INVENTION

However, as the inventors researched the element further, the following problems are found. That is, it is necessary to increase the intensity of excitation light for improving the intensity of fluorescence. However, as the intensity of the excitation light is increased, the intensity of the fluorescence may be lowered and the unevenness of the brightness and color may occur as time passes in use. Thus, it is necessary to maintain the intensity of the fluorescence in the emitted light high and to suppress the unevenness of the brightness and color.

An object of the present invention is, in making an excitation light incident onto a phosphor part to generate a fluorescence, to improve the fluorescence intensity of an emitted light and to suppress the unevenness of brightness of emitted white light.

The present invention provides a phosphor element comprising an incident face for an excitation light, an emitting face opposing said incident face and a side face, the phosphor element converting at least a part of said excitation light incident onto the incident face into a fluorescence and emitting the fluorescence from the emitting face:

wherein said emitting face has an area greater that an area of said incident face; and wherein the phosphor element comprises an inclination region in which an inclination angle of the side face with respect to a vertical axis perpendicular to the emitting face is monotonously increased from the incident face toward the emitting face, viewed in a cross-section perpendicular to the emitting face and along the longest dividing line halving the emitting face.

Further, the present invention provides a phosphor device comprising:

the phosphor element and;

a reflection film covering at least a part of said side face.

Further, the present invention provides an illumination apparatus comprising a light source oscillating a laser light and the phosphor device.

According to the phosphor element of the present invention, in the case that the excitation light is made incident onto the phosphor part to generate the fluorescence, the fluorescence intensity of the emitted light could be successfully improved. That is, it is researched the embodiment of providing the inclination region in which the inclination angle of the side face with respect to the vertical axis perpendicular to the emitting face is monotonously increased from the incident face toward the emitting face. In other words, it means the morphology that the horizontal width of the phosphor element is enlarged in skirt-like shape toward the emitting face (see FIG. 1).

By applying such embodiment, it is found that the fluorescence intensity of the emitted light can be improved particularly and mainly in the outer peripheral part of the emitting face 3 and that the overall efficiency of the generation of the fluorescence can be improved. In addition to this, the unevenness in the brightness may occur mainly in the outer peripheral part of the emitting face 3 according to prior arts, and it is found that the intensity of the emitted light in the outer peripheral part is improved to result in the suppression of the unevenness of the brightness. The present invention is thus made.

BRIEF DESCRIPTION OF THE DRAWINGS

FIG. 9 (a) shows the state that many phosphor elements 1 are formed on the handle substrate 23, and FIG. 9(b) is a perspective view showing the state that a low-refractive index film 10 and reflection film 11 are provided on the surface of each phosphor element and bonding layer 22.

MODES FOR CARRYING OUT THE INVENTION

The phosphor element of the present invention includes an incident face of an excitation light, an opposing face opposing the incident face and a side face, and the phosphor element converts at least a part of the excitation light incident onto the phosphor element to fluorescence and emits the fluorescence from the incident face.

Here, in the case that the whole of the excitation light is converted to the fluorescence, only the fluorescence is emitted from the incident face. Alternatively, a part of the excitation light may be converted into the fluorescence so that the fluorescence and excitation light may be emitted from the incident face.

Figure 1:
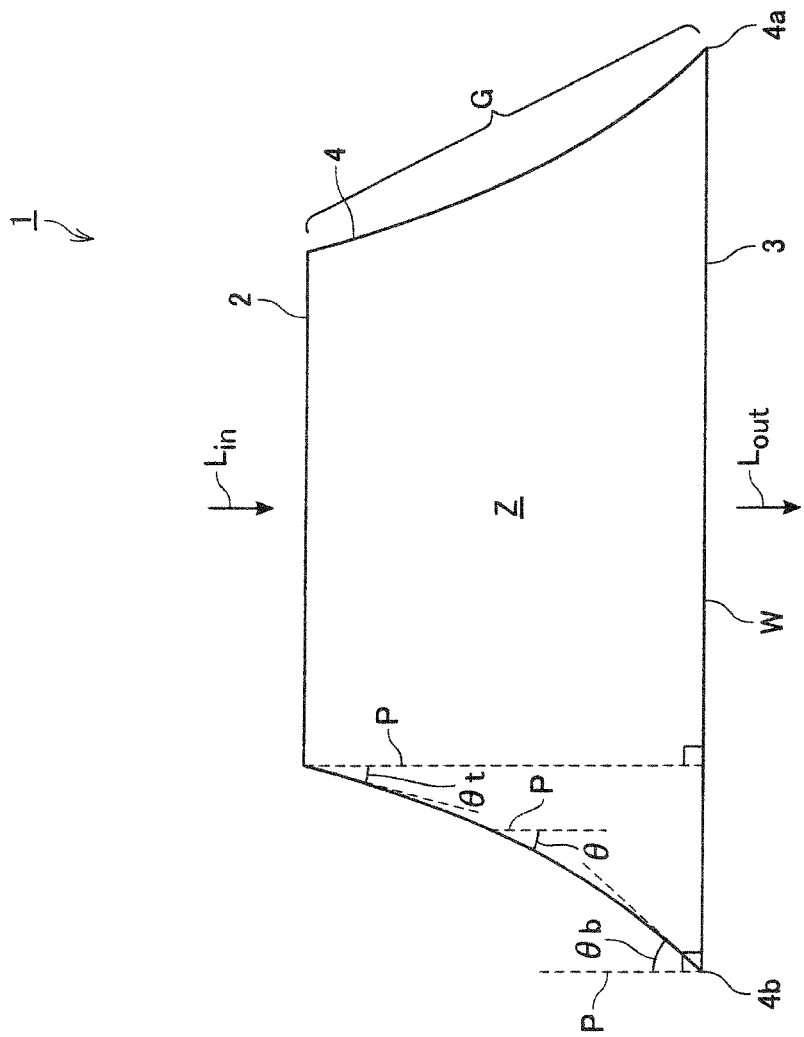
FIG. 1 is a cross sectional view showing a phosphor element 1 according to an embodiment of the present invention.

FIG. 1 is a perspective view showing a phosphor element 1 according to an embodiment of the present invention. The phosphor element 1 includes at least an incident face 2 of an excitation light, an opposing face 3 and a side face 4. The side face means a face extending between the incident face and opposing face. Here, the shape of the phosphor element is not particularly limited. The shapes of the incident face and emitting face are preferably be convex figures and more preferably be convex figures composed of curved line having no corner therein. Alternatively, in the case that the corner is present on the outer outline of the incident face or emitting face, the angle of the corner may preferably be 108° or larger. Specifically, the shape of the incident face or emitting face may be circle, ellipse, polygon (square, pentagon, hexagon, heptagon). Further, R or C part may be provided or a recess due to the thickness reduction may be formed at the corner of the outer outline of the incident face or emitting face.

Figure 2A:
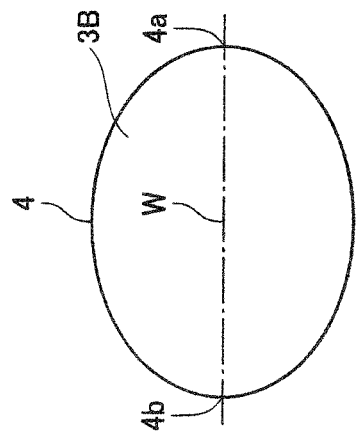
FIGS. 2(a), 2(b), 2(c), 2(d), 2(e) and 2(f) show front views showing outlines of emitted faces, respectively.
Figure 2B:
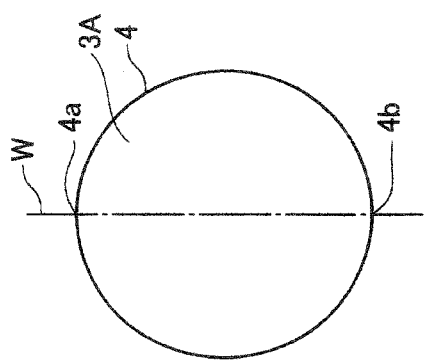
Figure 2C:
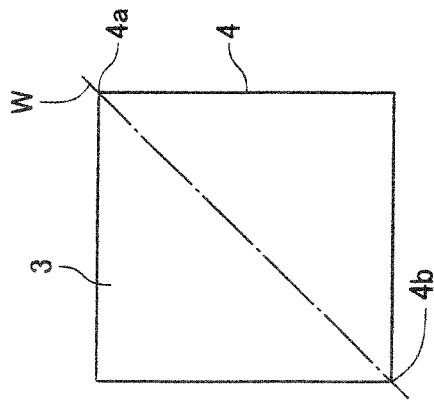
Figure 2D:
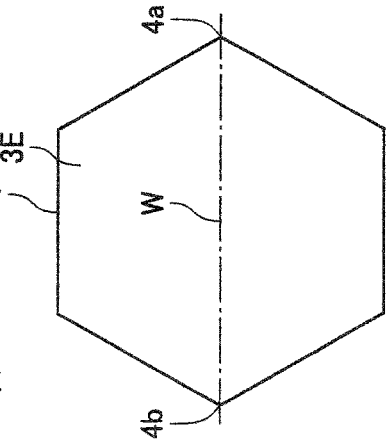
Figure 2E:
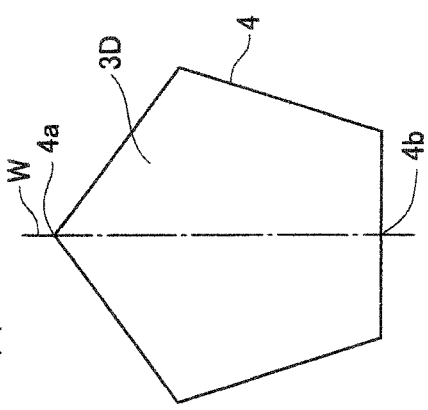
Figure 2F:
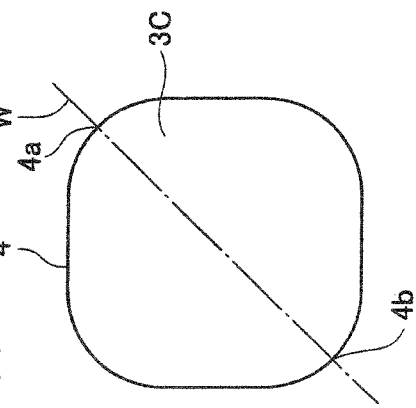

For example, according to the example of FIG. 2(a), the emitting face 3 is of a square or rectangle, according to the example of FIG. 2(b), the emitting face is of a circle, according to the example of FIG. 2(c), the emitting face 3B is of an ellipse, according to the example of FIG. 2(d), the emitting face 3C is of a square or a shape of a rectangle whose four corners are rounded (R), according to the example of FIG. 2(e), the emitting face is of a pentagon, and according to the example of FIG. 2(f), the emitting face is of a hexagon. 4 represents a side face.

Figure 3:
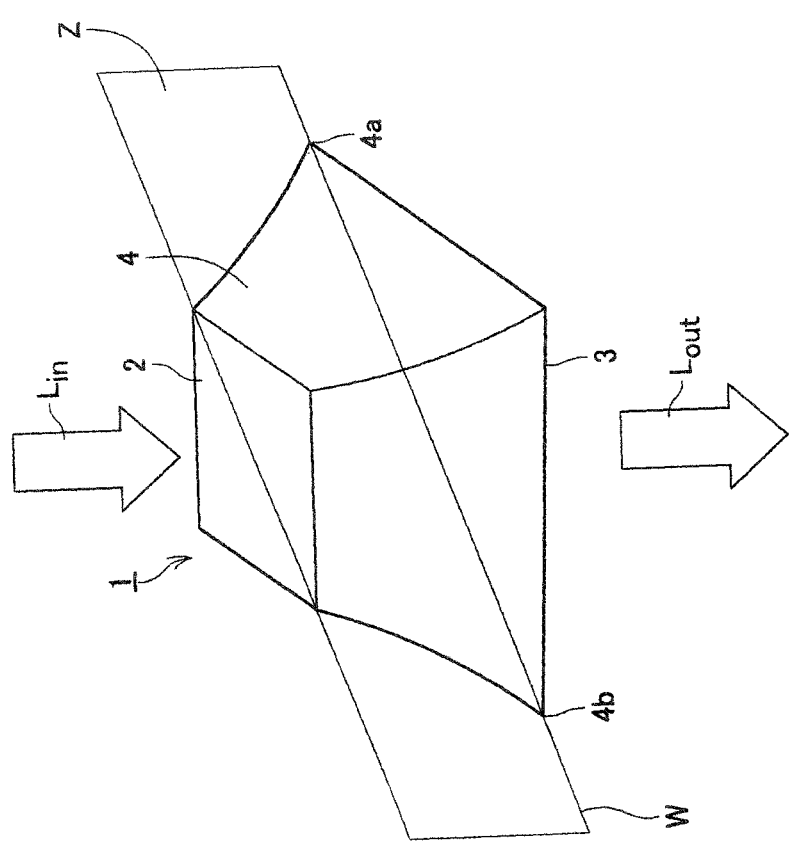
FIG. 3 is a perspective view of the phosphor element of FIG. 1.

As shown in FIGS. 1 and 3, the excitation light is made incident onto the incident face 2 of the phosphor element 1 as Lin. And the excitation light collides phosphors in the phosphor element to generate fluorescence. The fluorescence and excitation light are emitted from the emitting face 3 as Lout.

Here, according to the phosphor element of the present invention, the area of the emitting face 3 is greater than the area of the incident face 2. Further, the shape of the side face is devised. That is, as shown in FIGS. 2(a) to 2(f), it is speculated the longest dividing lines W halving the emitting faces 3 to 3E, respectively, on the viewpoint of the areas. 4a and 4b represent contact points of the dividing line W and outer outline of the emitting face, respectively. The cross section Z perpendicular to the emitting face and along the dividing line W is shown in FIGS. 1 and 3. In the case that the cross section is viewed, it is provided an inclination region G in which the inclination angle θ of the side face with respect to the vertical axis P perpendicular to the emitting face 3 is monotonously increased from the incident face 2 toward the emitting face 3.

Here, θ is monotonously increased, meaning that θ is continuously increased on mathematical sense without a region in which θ is decreased or θ takes a constant value. Further, the degree of monotonous increase of the inclination angle θ is not particularly limited, and it may be increased at a constant rate in the thickness direction of the phosphor element. That is, provided that x is assigned to a distance from the incident face, the inclination angle θx may be increased in proportion to x, or it may be increased in proportion to x squared, or it may be increased in proportion to the square root of x.

Further, the inclination region G may be provided over the whole length from the incident face to the emitting face of the phosphor element or may be provided in a part of the region between the incident face to the emitting face of the phosphor element. In this case, a region in which the inclination angle θ is not monotonously increased may be provided on the side of the incident face of the phosphor element, or the region in which the inclination angle θ is not monotonously increased may be provided on the side of the emitting face of the phosphor element, Further, the phosphor element may be equipped with a plurality of the inclination regions in which the inclination angle θ is monotonously increased. In this case, the number of the inclination regions may preferably be 2 to 5 and more preferably be 2 to 3. Further, in the case that it is provided a plurality of the inclination regions in which the inclination angle θ is monotonously increased, the adjacent inclination regions may be made continuous or a region in which the inclination angle θ is constant may be provided between the adjacent inclination regions.

Here, on the viewpoint of the present invention, it is preferred that the inclination region reaches the emitting face, so that it is possible to improve the intensity of the emitted light particularly from the outer peripheral part of the emitting face and to reduce the unevenness in the brightness.

According to a preferred embodiment, the difference between the inclination angle θt in the inclination region at the end on the side of incident face 2 and the inclination angle θb in the inclination region at the end on the side of the emitting face 3 is 3° or larger and 45° or smaller. On the viewpoint of the present invention, θb−θt may more preferably be 5° or larger and may more preferably be 40° or smaller.

According to a preferred embodiment, the inclination angle θt of the inclination region at the end on the side of the incident face is 20° or larger and 62° or smaller. θt may preferably be 25° or larger and most preferably be 45° or smaller.

On the viewpoint of the present invention, the inclination angle θb of the inclination region at the end on the side of the emitting face may preferably be 23° or larger and 65° or smaller. θb may more preferably be 40° or larger and more preferably be 60° or smaller.

According to the present invention, as the inclination region is provided, it is necessary that the area of the emitting face 3 is made larger than the area of the incident face 2. Here, on the viewpoint of the present invention, the ratio of the areas (area of the emitting face 3)/(area of the incident face 2) may preferably be 3 or higher and more preferably be 5 or higher. Further, as the ratio of the areas (area of the emitting face 3)/(area of the incident face 2) is too large, color unevenness tends to occur. The ratio of the areas (area of the emitting face 3)/(area of the incident face 2) may preferably be 40 or lower and more preferably be 35 or lower.

The thickness (distance between the incident face and emitting face) of the phosphor element may preferably be 250 to 1000 μm and more preferably be 300 to 700 μm, on the viewpoint of the present invention.

Figure 4:
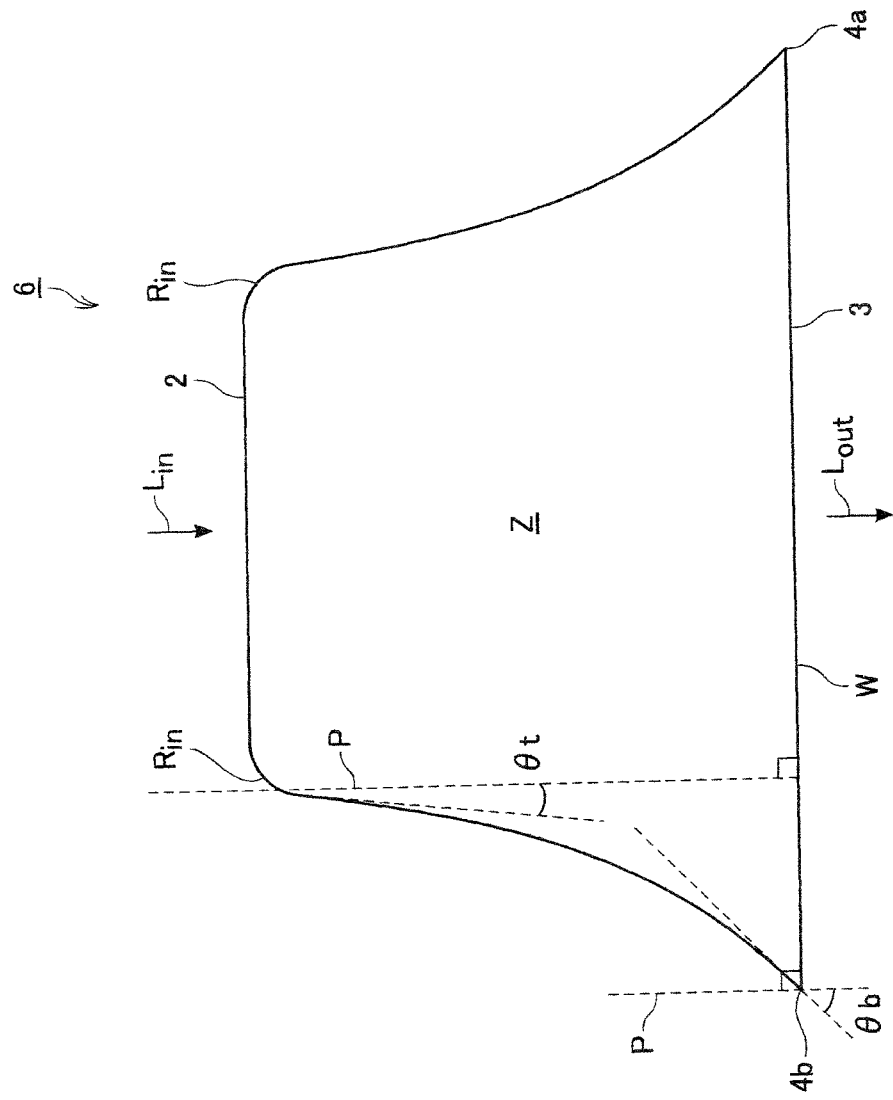
FIG. 4 is a cross sectional view showing a phosphor element 6 according to another embodiment of the present invention.

FIG. 4 shows a phosphor element 6 according to another embodiment of the present invention.

Although the phosphor element 6 is similar to the phosphor element 1 of FIG. 1, a curved part Rin may be provided along the outer peripheral part of the incident face. It is thereby possible to suppress the unevenness in brightness and color unevenness of white light in the case that the white light is emitted. On the viewpoint of suppressing the brightness and color unevenness, the curved part may be provided in the outer peripheral part of the emitting face 3.

Figure 5:
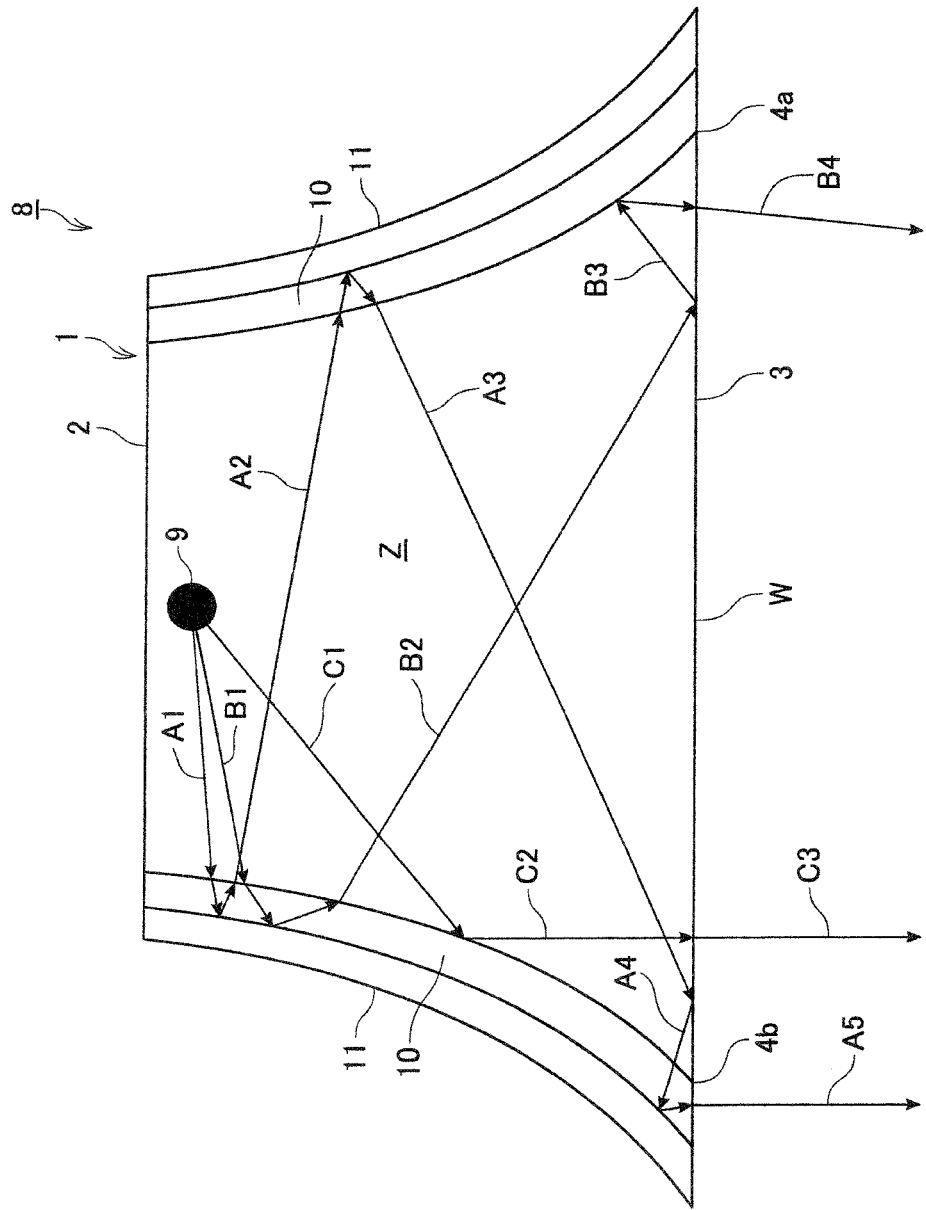
FIG. 5 is a cross sectional view showing a phosphor device 8 according to an embodiment of the present invention.
Figure 6:
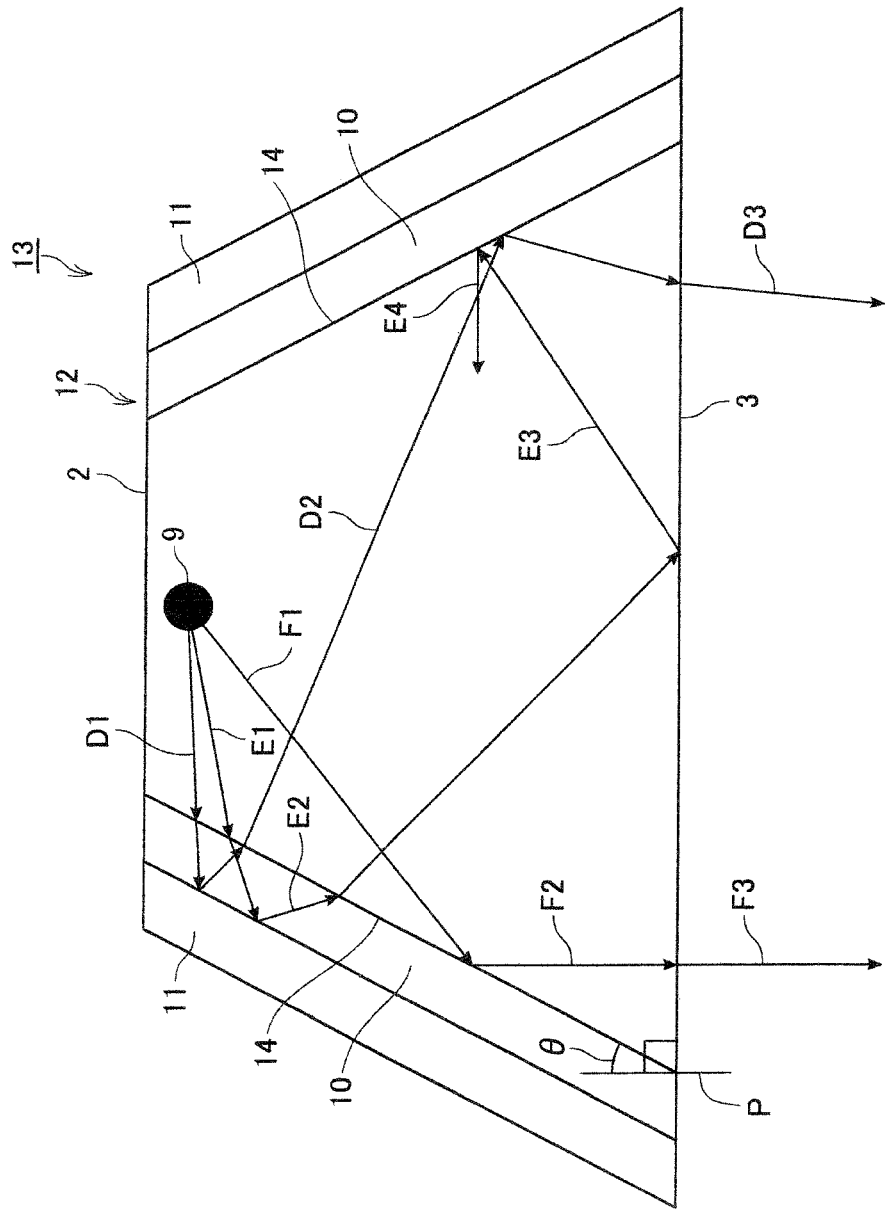
FIG. 6 is a cross sectional view showing a phosphor device 13 according to a reference example.

Then, the effects of the phosphor element of the present invention will be further described, referring to FIGS. 5 and 6.

As shown in FIG. 5, the excitation light is to be made incident onto the phosphor element 1. Further, according to the present example, a low refractive index layer 10 and reflection film 11 described below are film formed on the side face 4 of the phosphor element 1 to produce a phosphor element 8.

Many phosphor centers 9 (phosphor particles or rare earth ions) are dispersed in the phosphor element 1. Fluorescence is oscillated from the phosphor centers 9 in the whole directions on Lambertian mode. Here, fluorescence C1 oscillated substantially toward the side of the emitting face 3 is reflected at the side face as C2, and emitted from the emitting face as C3. On the other hand, fluorescence oscillated in the horizontal direction as arrows A1 and B1 are repeatedly reflected at the side face 4 as A2, A3 and B2 and propagated toward the emitting face. At this time, the phosphor element 1 has the shape in which the phosphor element is enlarged in the vicinity of the emitting face 3. As a result, fluorescence A4 or B3 totally reflected at the emitting face 3 in the outer peripheral part of the emitting face 3 propagates in the enlarged outer peripheral part as it is, further propagates toward the outer peripheral part of the emitting face and finally tends to be emitted from the outer peripheral part of the emitting face 3 as A5 or B4. It is thereby possible to improve the intensity of the emitted light from the outer peripheral part of the emitting face 3.

On the other hand, the phosphor element 12 and phosphor device 13 as shown in FIG. 6 and according to the comparative embodiment have an outline of a trapezoid viewed in the cross section. The phosphor element 12 includes an incident face 2, emitting face 3 and a side face 14 between the incident face and emitting face. According to the present example, the inclination angle θ of the side face 14 with respect to the vertical axis P perpendicular to the emitting face is constant. Further, the low refractive index layer 10 and reflection film 11 are provided on the side face 14 of the phosphor element 12.

Many phosphor centers 9 (phosphor particles or rare earth ions) are dispersed in the phosphor element 12. Fluorescence is oscillated from the phosphor centers 9 in all the directions on Lambertian mode. Here, fluorescence F1 oscillated substantially toward the emitting face 3 is reflected at the side face as F2 and then emitted as F3 from the emitting face. Such fluorescence is same as that in the phosphor element 1 shown in FIG. 5.

Further, fluorescence oscillated in the lateral direction as arrows D1 or E1 was repeatedly reflected at the side face 14 as D2 and E2 and directed toward the emitting face. At this time, according to the phosphor element 12, the base of the phosphor element does not particularly has enlarged shape and the inclination angle θ is constant in the vicinity of the emitting face 3. As a result, fluorescence E3 totally reflected at the emitting face 3 in the outer peripheral part of the emitting face 3 is further repeatedly reflected as E4. On the other hand, the fluorescence D2 is reflected at the side face 14 and emitted from the emitting face as D3. According to such shape, the emission of the fluorescence from the emitting face 3 is suppressed in the outer peripheral part of the emitting face 3 so that the intensity of the fluorescence tends to be lowered.

According to a preferred embodiment, the phosphor element may include a plurality of the inclination regions in which the inclination angle θ is monotonously increased.

Figure 11:
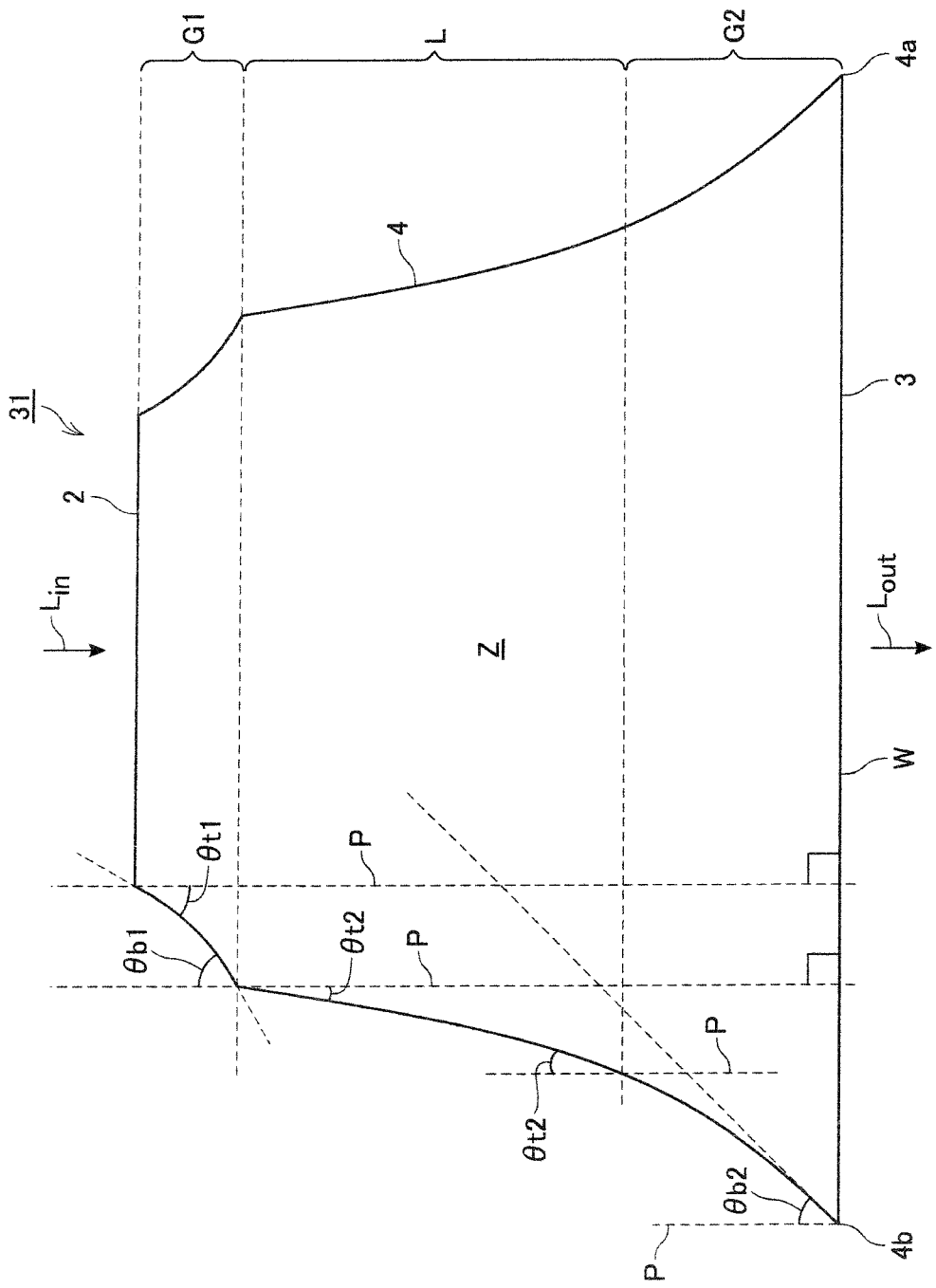
FIG. 11 is a cross sectional view showing a phosphor element 31 according to still another embodiment of the present invention.

FIG. 11 is a cross sectional view schematically showing a phosphor element 31 according to this embodiment. Although the phosphor element 31 is similar to the phosphor element 1, it is provided a plurality of the inclination regions in which the inclination angle θ is monotonously increased.

The excitation light is made incident onto the incident face 2 of the phosphor element 31 as Lin. The excitation light collides the phosphors in the phosphor element 31 to generate fluorescence. The fluorescence and excitation light are emitted from the emitting face 3 as Lout. The area of the emitting face 3 is larger than the area of the incident face 2.

FIG. 11 shows a cross section Z perpendicular to the emitting face along a dividing line W. In the case that the cross section is observed, it is provided a plurality of the inclination regions G1 and G2 in which the inclination angle θ of the side face 4 with respect to the vertical axis P perpendicular to the emitting face 3 is monotonously increased from the incident face 2 toward the emitting face 3.

Among these inclination regions, the inclination region G1 is provided on the side of the incident face 2, and the inclination region G2 is provided on the side of the emitting face 3. Then, it is provided a region L, in which the inclination angle is constant, between the inclination region G1 and inclination angle G2.

Among fluorescence emitted from the phosphor particles in the phosphor element through Lambertian luminance, light returned to the side of the incident face is reflected at the incident face 2 and then propagated to the side of the emitting face 3 again. At this time, in the inclination region G1, the inclination angle of the side face on the side of the incident face 2 is monotonously increased to open to the emitting face side, so that the fluorescence component propagating to the side of the emitting face 3 without being reflected at the incident face 2 is increased. Further, the fluorescence can be directed to the side of the emitting face 3 at a smaller number of the reflections after it is reflected at the incident face 2.

In the case that it is provided only one inclination region in which the inclination angle is monotonously increased, the substrate may become too thin and the area of the emitting side may become too large, so that the color unevenness may be generated. For this, by providing the additional inclination region on the side of the emitting face, it is possible to adjust the thickness of the substrate and area of the emitting side at will while avoiding the color unevenness.

The inclination angle θt1 of the side face at the end on the incident face side of the inclination region G1 on the side of the incident face may preferably be 20° or larger and 62° or smaller and more preferably be 25° or larger and 45° or smaller.

The inclination angle θb1 of the side face at the end of the inclination region G1 on the side of the emitting face may preferably be 23° or larger and 65° or smaller and more preferably be 40° or larger and 60° or smaller.

The inclination angle is θt2 in the region L in which the inclination angle is constant.

The inclination angle θt2 of the side face, at the end on the incident face side, of the inclination region G2 on the side of the emitting face may preferably be 20° or larger and 62° or smaller and more preferably be 25° or larger and 45° or smaller. The inclination angle θt2 is smaller than the inclination angle θb1.

The inclination angle θb2 of the side face, at the end on the emitting face side, of the inclination region G2 on the side of the emitting face may preferably be 23° or larger and 65° or smaller and more preferably be 40° or larger and 60° or smaller.

According to a preferred embodiment, a heat dissipation substrate may be further provided outside of the phosphor element or phosphor device. That is, according to a phosphor device 18 shown in FIG. 7, the low refractive index layer 10 and reflection film 11 are provided on the side face of the phosphor element 1, and a heat dissipation substrate 20 is further provided outside of the reflection film 11. It is thereby possible to facilitate the heat dissipation and to further reduce the color unevenness of the emitted light.

Although the phosphor constituting the phosphor element is not limited as far as it can convert the excitation light into the fluorescence, it includes a phosphor glass, phosphor single crystal and phosphor polycrystal.

Further, a scattering material may be added or pores may be formed in the phosphor for scattering the excitation light and fluorescence. In this case, the light incident into the phosphor is scattered in the phosphor so that the emitted lights (excitation light and fluorescence) are scattered and the scattering angle is made larger.

The scattering angle can be measured by a scattering measuring system "Mini-Diff" supplied by Cybernet Systems Co., Ltd., for example. The scattering angle is defined as a total width angle at which it takes a value of $1/e^2$ of the peak value in transmittance spectrum of the emitted light.

At the time, the scattering angle may preferably be 5° or more and more preferably be 10° or more. Then, although the upper limit of the scattering angle of the phosphor forming the phosphor element is not particularly defined, it may be not larger than the numerical aperture (NA) of the emitted light and may be 80° or lower on a practical viewpoint.

The phosphor glass means a base glass into which the ion of a rare earth element is dispersed.

As the glass serving as the base, oxide glasses containing silica, boron oxide, calcium oxide, lanthanum oxide, barium oxide, zinc oxide, phosphorus oxide, aluminum fluoride, magnesium fluoride, calcium fluoride, strontium fluoride, or barium chloride may be exemplified.

Though the rare earth ions diffused in the phosphor glass are preferably Tb, Eu, Ce, or Nd, the rare earth ions may be La, Pr, Sc, Sm, Er, Tm, Dy, Gd, or Lu.

As the phosphor single crystal, $Y_3Al_5O_{12}$, $Ba_5Si_{11}Al_{17}N_{25}$, $Tb_3Al_5O_{12}$, and YAG (yttrium aluminum garnet) are preferable. A part of the Y (yttrium) of YAG may be replaced with Lu. Further, a dopant doped into the phosphor single crystal may preferably be a rare earth ion and particularly preferably be Tb, Eu, Ce, and Nd, and the rare earth ions may be La, Pr, Sc, Sm, Er, Tm, Dy, Gd, or Lu.

Further, as the phosphor polycrystal, TAG (terbium aluminum garnet) series, sialon series, nitride series, BOS (barium orthosilicate) series, and YAG (yttrium aluminum garnet) are exemplified. A part of the Y (yttrium) of YAG may be replaced with Lu.

A dopant doped into the phosphor polycrystal may preferably be a rare earth ion and particularly preferably be Tb, Eu, Ce, and Nd, and the rare earth ions may be La, Pr, Sc, Sm, Er, Tm, Dy, Gd, or Lu.

Further, the phosphor element of the present invention may be a non-grating type phosphor device which does not include a grating within the phosphor element, or a grating device, in which the grating is provided in the phosphor element.

A partial transmission film may be provided on the incident face of the phosphor element. The partial transmission film is a film reflecting a part of the excitation light and transmitting the remainder. Specifically, a reflectivity of the partial transmission film with respect to the excitation light is 9 percent or higher and is preferably 50 percent or lower. The material of the partial transmission film includes the metal film or the dielectric multi-layered film for the reflection film as described below.

According to a preferred embodiment, the heat dissipation substrate provided on the side face of the phosphor element may preferably be made of a material having a thermal conductivity (25° C.) of 200 W/mK or higher. Although the upper limit of the thermal conductivity is not particularly limited, it may preferably be made 500 W/mK or lower and more preferably be 350 W/mK or lower, on the viewpoint of practical availability.

The material of the heat dissipation substrate may preferably be gold, silver, copper, aluminum or an alloy containing the metal.

Further, the material of the heat dissipation substrate may preferably be a ceramic material such as silicon carbide and aluminum nitride. In the case of the ceramic material, the thermal expansion coefficient can be matched with that of the phosphor at some degree. It is thus advantageous in that the reliability can be improved, for example, and the cracks or fracture due to thermal stress can be prevented.

According to still another embodiment, in the case that the heat dissipation substrate is composed of a metal, it may be made of metal plating, spraying or sintered type bonding agent. In this case, it is possible to make the phosphor element and heat dissipation substrate contact densely with each other. Specifically, it is possible to provide metal bonding of a metal film formed on the phosphor element and metal forming the heat dissipation substrate. It is thereby possible to reduce the thermal resistance and to improve the heat dissipating property.

Copper or silver are exemplified as the kind of the sintered type bonding agent. Metal powder paste can be applied and molded on the phosphor element and then sintered at 200° C. to 350° C. to form the heat dissipation substrate composed of the sintered type bonding agent.

The sintered type bonding agent may be used for filling or fixing the phosphor element in the heat dissipation substrate produced by a metal or ceramics in advance.

As the material of the low refractive index layer, aluminum oxide, magnesium oxide, aluminum nitride, tantalum oxide, silicon oxide, silicon nitride, aluminum nitride and silicon carbide are exemplified. Further, the refractive index of the low refractive index layer may preferably be not higher than the refractive index of the phosphor, and may preferably be 1.7 or lower and more preferably be 1.6 or lower in the case of YAG phosphor. The lower limit of the refractive index of the low refractive index layer is not particularly defined and 1 or higher, and may be 1.4 or higher on a practical viewpoint.

In the case that the low refractive index layer is present between the phosphor part and reflection film, the low refractive index layer may preferably be composed of a material whose refractive index is lower than that of the phosphor. By this, it is possible to utilize the total reflection due to the difference of refractive indices of the phosphor and low refractive index layer, to reduce the optical component reflected at the reflection film, and to suppress the absorption of light due to the reflection at the reflection film. Further, aluminum oxide and magnesium oxide are most preferred, on the viewpoint of heat dissipation property.

The thickness of the low refractive index layer may preferably be 1 μm or smaller, so that the influences on the heat dissipation can be reduced. Further, on the viewpoint of the bonding strength, the thickness of the low refractive index layer may preferably be 0.05 μm or larger.

The material of the reflection film is not particularly limited, as far as it is possible to reflect the excitation light and fluorescence passing through the phosphor element. It is not necessary that the excitation light is reflected by the reflection film by total reflection, and a part or whole of the excitation light may be transmitted through the reflection film.

According to a preferred embodiment, the reflection film is a metal film or dielectric multi-layered film.

In the case that the reflection film is composed of the metal film, the reflection can be performed in a wide wavelength range, the dependency on the incident angle can be lowered, and temperature-resistance and weather-resistance are excellent. On the other hand, in the case that the reflection film is composed of the dielectric multi-layered film, as the absorption is avoided, it is possible to convert the incident light to the reflection light by 100 percent without loss, and as the reflection film can be formed with oxide films, it is possible to improve the adhesion with the bonding layer to prevent the separation.

The reflectivity of the excitation light by the reflection film is 80 percent or higher and preferably 95 percent or higher, and the total reflection is permitted.

The dielectric multi-layered film is a film formed by alternately laminating high refraction materials and low reflection materials. The high reflection materials include $TiO_2$, $Ta_2O_3$, $Ta_2O_3$, ZnO, $Si_3N_4$ and $Nb_2O_5$. Further, the low refraction materials include $SiO_2$, $MgF_2$ and $CaF_2$. The number of lamination and total thickness of the dielectric multi-layered film are appropriately selected depending on the wavelength of fluorescence to be reflected.

The material of the metal film may preferably be the following.

(1) a single layered-film such as Al, Ag or Au (2) a multi-layered film such as Al, Ag or Au Although the thickness of the metal film is not particularly limited as far as the fluorescence can be reflected, the thickness may preferably be 0.05 μm or larger and more preferably be 0.1p m or larger. Further, for improving the adhesion of the metal film and substrate, it may be formed through a metal film such as Ti, Cr, Ni or the like.

Although the method of forming the dielectric multi-layered film and metal film is not particularly limited, vapor deposition, sputtering and CVD methods are preferred. In the case of the vapor deposition method, ion-assist can be added to perform the film-formation.

Further, the illumination device of the present invention includes a light source oscillating laser light and the phosphor element described above.

As the light source, it is preferred a semiconductor laser using an GaN material and having high reliability for excitation of a phosphor for illumination. It can be further realized a light source such as a laser array with laser elements arranged one-dimensionally. It may be used a super luminescence diode, semiconductor optical amplifier (SOA) or LED. Further, the excitation light from the light source may be made incident onto the phosphor element through an optical fiber.

Although the method of generating white light from the semiconductor laser and phosphor is not particularly limited, the following methods are considered.

Method of generating yellow fluorescence from a blue light laser and phosphor to obtain white light.

Method of generating red and green fluorescence from a blue laser and phosphor to obtain white light.

Figure 8A:
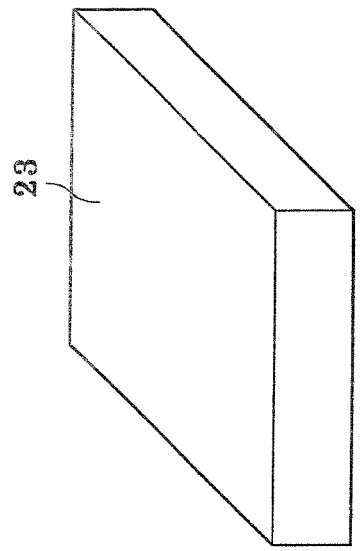
FIG. 8(a) is a perspective view showing a phosphor plate 21.
Figure 8B:
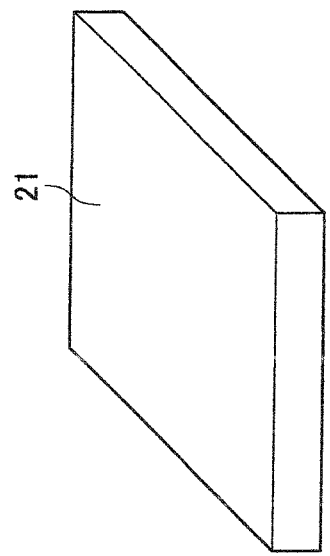
FIG. 8(b) is a perspective view showing a handle substrate 23.
Figure 8C:
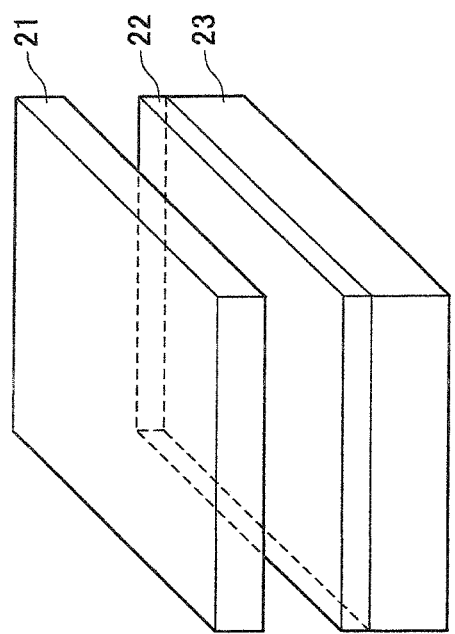
FIG. 8(c) is a perspective view showing the state that the phosphor plate 21 and handle substrate 23 are bonded.

Further, method of generating red, blue and green fluorescence by a phosphor from a blue laser or ultraviolet laser to obtain white light Method of generating blue and yellow fluorescence by a phosphor from a blue laser or ultraviolet laser to obtain white light The method of producing the phosphor element and phosphor device will be described. FIG. 8(*a*) shows a phosphor plate 21, and FIG. 8(*b*) shows a handle substrate 23. As shown in FIG. 8(*c*), a bonding layer 22 is formed on the handle substrate 23 and opposed to the phosphor plate 21. Then, the phosphor plate 21 is bonded onto the handle substrate 23.

The phosphor plate of the handle substrate may be then processed to form the phosphor element having necessary shape. For example, according to an example shown in FIG. 9(*a*), many phosphor elements 1 each having the desired shape are formed on the bonding layer 22. Such processing method includes dicing, slicing, micro grinder, laser processing, water jet, and micro blast.

The surface roughness Ra of the thus formed processed surface by the processing method described above may be made low, for suppressing the scattering due to the reflection of the light reached at the side face. The surface roughness of the processed surface may preferably be 0.5 μm or lower and more preferably be 0.2 μm or lower on the viewpoint.

Then, according to a preferred embodiment, as shown in FIG. 9(b), the low refractive index layer 10 and reflection film 11 are then formed in the order on the phosphor element 1 and bonding layer 22. The handle substrate 23 and bonding layer 22 are then removed to obtain a laminated body. The laminated body is cut to obtain desired phosphor devices.

EXAMPLES

Inventive Example 1

Figure 7:
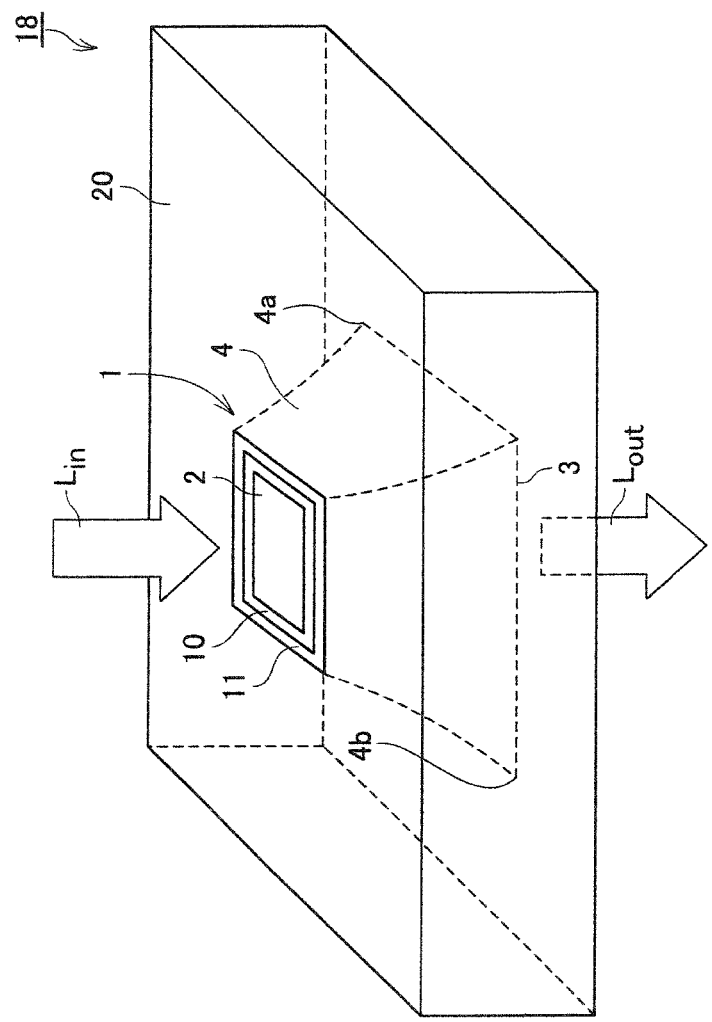
FIG. 7 is a cross sectional view showing a phosphor device 18 according to another embodiment of the present invention.

The phosphor element 1 and phosphor device 18 shown in FIGS. 1, 5 and 7 were produced according to the method described referring to FIGS. 8 and 9.

Specifically, as shown in FIG. 8, it was prepared a phosphor plate 21 having a thickness of 0.4 mm, a diameter of 4 inches and composed of YAG (yttrium aluminum garnet) polycrystal doped with Ce and containing added ceramic scattering material, and a sapphire wafer (handling substrate) 23 having a thickness of 0.3 mm and a diameter of 4 inches. Thermoplastic resin 22 was used to perform the bonding of the both at a high temperature of 100° C., and it was returned to room temperature to complete the integration.

Then, set-back processing was then performed by dicing using a blade of a width of 100 μm and #1500, so as to obtain the phosphor body having the shape that the width of the incident face was 0.15 mm and the side face was inclined in the direction of the thickness until the inclination angle θt on the input side was 30° and the inclination angle θb on the output side was 40° as shown in FIG. 1. Then, the phosphor plate was rotated by 90° and subjected to the set-back processing by dicing to obtain the same width and angles θt and θb as described above. At this stage, the surface roughness of the processed surface of the phosphor element 1 was estimated as 0.5 μm.

Then, the low refractive index layer 10 composed of $Al_2O_3$ was film-formed in a thickness of 0.5 μm by sputtering on the side face 4 of the phosphor element 1 after the processing. Further, the reflection film 11 composed of an Ag-based alloy film was film-formed on the side face in a thickness of 0.5 μm.

For forming the heat dissipation substrate on the thus obtained phosphor device by copper plating, Ni film was film-formed in 0.2 μm as an underlying electrode first. Thereafter, copper was plated on the side of the processed side face by electroplating, based on copper damascence process, so that a copper plating film of a thickness of 0.4 μm was finally formed. Thereafter, lapping and CMP polishing were performed for adjusting the surfaces of the phosphor element on the input side and copper plating.

The laminated body was then heated at 100° C. to soften the thermoplastic resin, the handle substrate 23 and bonding layer 22 were removed, and lapping and CMP polishing were then performed on the surface of the phosphor element on the side of the emitting face to adjust the surfaces of the heat dissipation substrate and phosphor.

Thereafter, it was film-formed a dichroic film, which was non-reflective with respect to a wavelength of 450 nm of the excitation light and was totally reflective with respect to a wavelength band of 560 nm of the fluorescence, was film-formed on the incident face of the phosphor element by an IBS (Ion-Beam Sputter Coater). A dichroic film was film-formed to provide the film transmitting the excitation light and reflecting the fluorescence only. It was finally cut into chips by dicing to produce phosphor devices 18 of 5 mm by 5 mm as shown in FIG. 7.

As to the phosphor devices formed into the chips, light sources of outputs of 3 W and 30 W, respectively, consisting of a GaN blue light laser of an output of 3 W and an array including 10 of the lasers, were applied to evaluate the illumination light. The results of the evaluation of the devices were shown in table 1.

Further, the angle of the direction of growth of the metal plating film from the main face of the heat dissipation substrate on the side of the opposing face and of the incident face was 90°. Further, the direction of the growth of the metal plating film can be observed by a scanning type electron microscope.

(Output Power of while Light)

The output power of white light (average output power) indicates an average per time of total luminous flux. Total luminous flux measurement was carried out by using an integrating sphere (spherical integrating photometer), by turning on a light source to be measured and a standard light source, in which the total luminous flux was calibrated to values, at the same position, and by comparing them with each other. The measurement was carried out by using the method prescribed in JIS C7801 in detail.

(Distribution of Unevenness of Brightness)

The emitted light was subjected to measurement of the brightness distribution by means of a high-speed near-field light-distribution measuring system "RH50" supplied by OHTSUKA ELECTRONICS Co. Ltd. In the case that there is distribution in the brightness, it can be observed by conversion to color distribution (or brightness and darkness).

Based on the distribution of the brightness, "Se" is defined as an area region of the brightness at which the brightness takes $1/e^2$ folds of the peak brightness value Pmax. It is defined as "unevenness of brightness is not observed" in the case that there is no part in which the brightness is not higher than Pmax×0.8 and it is defined as "unevenness of brightness is observed" in the case that the brightness lower than this value is present, in an area region Seff from the point of the brightness peak (center of the distribution of the brightness) to 0.5×Se.

(In-Plane Distribution of Color Unevenness)

Emitted light was evaluated in the chromaticity diagram by using a luminance distribution measurement device. Then, the case where the distribution is in a range of a median x: 0.3447±0.005 and y: 0.3553±0.005 is determined to be a case without the uneven color, and case where the distribution is not in this range is determined to be a case with the uneven color in the chromaticity diagram.

TABLE 1

| | | |
|---|---|---|
| Area of incident face 2 | | 22500 μm² |
| Area of emitting face 3 | | 504100 μm² |
| Area of emitting face 3/Area of incident face 2 | | 22.4 |
| Thickness of phosphor element 1 | | 400 μm |
| θ t | | 30° |
| θ b | | 40° |
| Output power of Excitation light | Output power of white light | 850 1 m |
| 3 W | Unevenness of brightness | None |
| | Color unevenness | Observed |
| Output power of Excitation light | Output power of white light | 2600 1 m |
| 30 W | Unevenness of | Observed |

TABLE 1-continued

| | | |
|---|---|---|
| | brightness | |
| | Color unevenness | None |

Inventive Example 2

In the phosphor element processed in the inventive example 1, before the film-formation of the low refractive index layer 10 on the side face 4, the incident face and emitting face were masked and the etching treatment of the outer peripheral part of the side face was performed by combining ion milling, reactive ion etching and wet etching.

Figure 10:
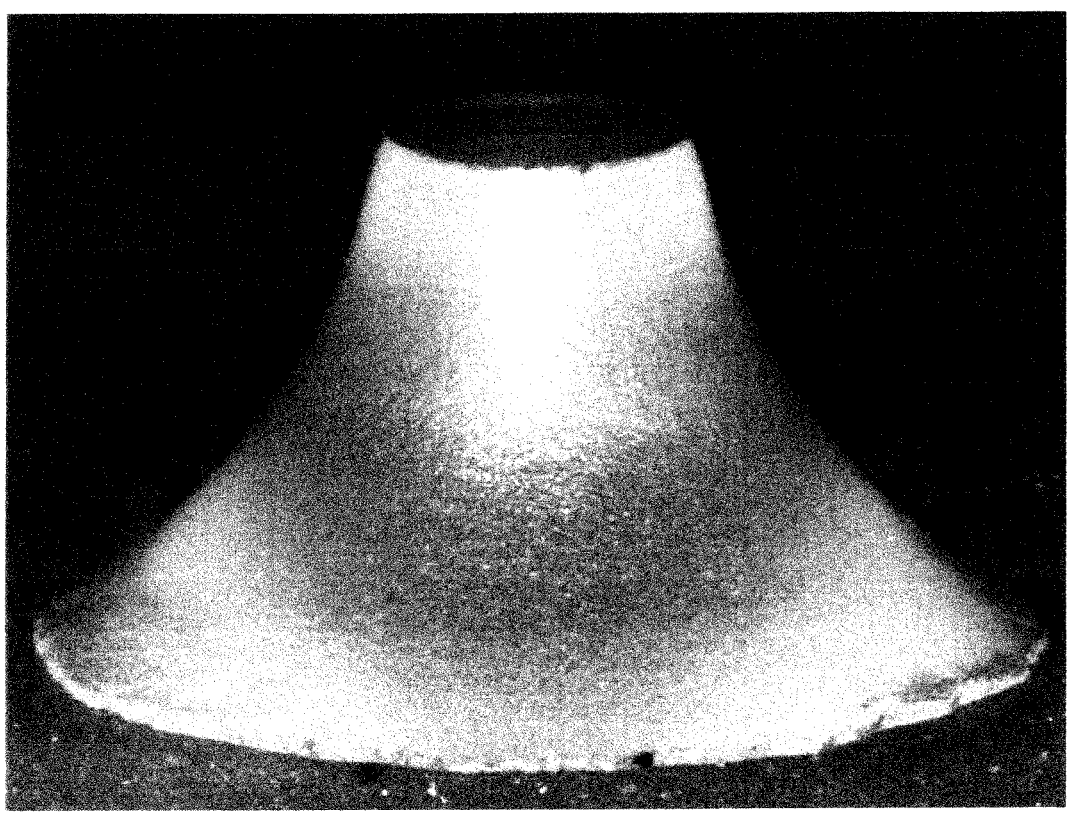
FIG. 10 is an optical photograph showing a perspective view of a phosphor element of example 2.

As a result, the corners of the outer peripheral part becomes smooth so that it was produced the phosphor element 6 having the cross section of the outer peripheral part of the incident face with the cross section composed of curved shape similar to an arc, as shown in FIG. 4. FIG. 10 shows a photograph of the thus produced phosphor element 6.

Thereafter, the phosphor device was produced according to the same procedure as that of the inventive example 1.

As to the phosphor devices formed into the chips, the light source consisting of the GaN blue light laser and of an output of 3 W and the light source composed of the array including 10 lasers and of an output of 30 W were applied to evaluate the illumination light. The results of the evaluation of the devices were shown in table 2.

TABLE 2

| | | |
|---|---|---|
| Area of incident face 2 | | 22500 μm² |
| Area of emitting face 3 | | 504100 μm² |
| Area of emitting face 3/Area of incident face 2 | | 22.4 |
| Thickness of phosphor element 1 | | 400 μm |
| θ t | | 30° |
| θ b | | 40° |
| Output power of Excitation light 3 W | Output power of white light | 850 1 m |
| | Unevenness of brightness | None |
| | Color unevenness | None |
| Output power of Excitation light 30 W | Output power of white light | 2600 1 m |
| | Unevenness of brightness | None |
| | Color unevenness | None |

Inventive Example 3

Figure 12:
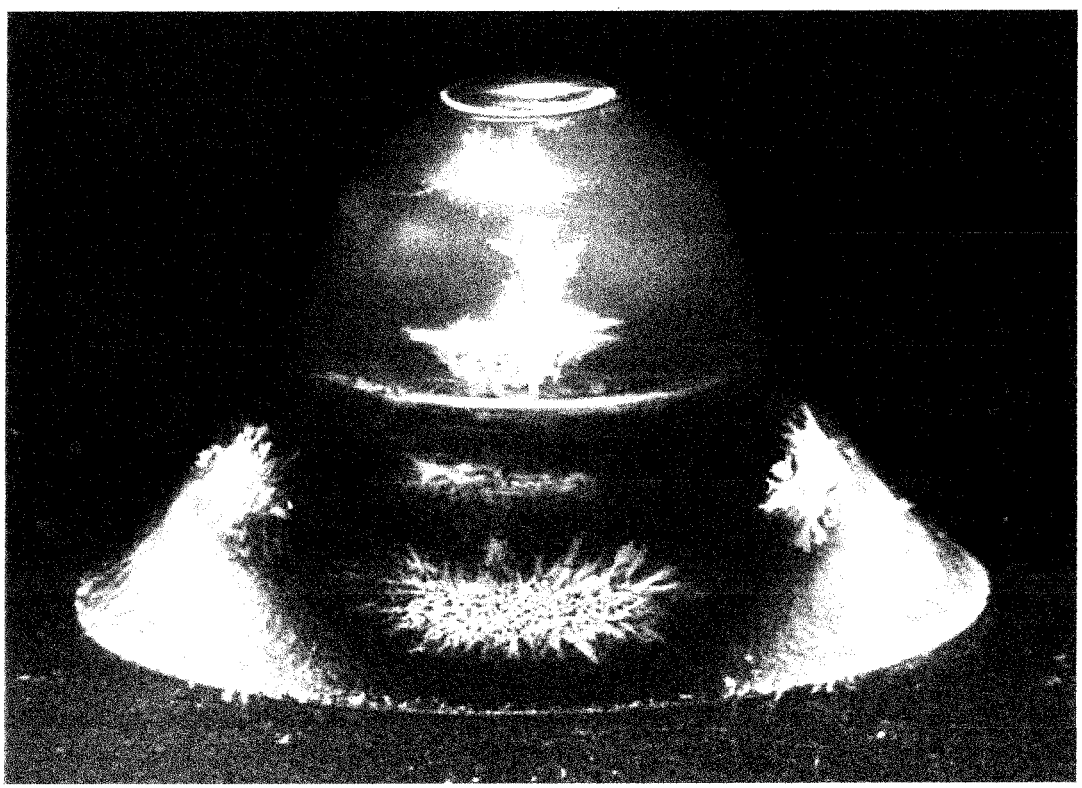
FIG. 12 is an optical photograph showing a perspective view of a phosphor element of example 3.

In the phosphor element processed in the inventive example 1, it was subjected to the etching treatment according to the similar process as that of the inventive example 2, to produce the phosphor element 31 shown in FIG. 11. FIG. 12 shows the thus produced phosphor element. Further, table 3 shows numerical values of the respective inclination angles. Further, the thickness of the incident face-side inclination region G1 was 0.1 mm, the thickness of the region L was 0.1 mm, and the thickness of the emitting face-side inclination region G2 was 0.2 mm.

Thereafter, the phosphor device was produced according to the same process as that of the inventive example 1.

As to the phosphor devices formed into the chips, the light source consisting of the GaN blue light laser and of an output of 3 W and the light source composed of the array including 10 lasers and of an output of 30 W were applied to evaluate the illumination light. The results of the evaluation of the devices were shown in table 3.

TABLE 3

| | | |
|---|---|---|
| Area of incident face 2 | | 22500 μm² |
| Area of emitting face 3 | | 504100 μm² |
| Area of emitting face 3/Area of incident face 2 | | 22.4 |
| Thickness of phosphor element 1 | | 400 μm |
| θ t 1 | | 30° |
| θ b 1 | | 40° |
| θ t 2 | | 25° |
| θ b 2 | | 40° |
| Output power of Excitation light 3 W | Output power of white light | 1000 1 m |
| | Unevenness of brightness | None |
| | Color unevenness | None |
| Output power of Excitation light 30 W | Output power of white light | 3000 1 m |
| | Unevenness of brightness | None |
| | Color unevenness | None |

Reference Example

The phosphor device having the shape shown in FIG. 6 was produced. The manufacturing procedure of the phosphor device was made same as that of the inventive example 1. However, different from the inventive example 1, the inclination angle θ of the side face of the phosphor element with respect to the vertical axis P was made constant and 35°. Thereafter, the phosphor device was produced according to the same procedure as that of the inventive example 1.

As to the phosphor devices formed into the chips, the light source consisting of the GaN blue light laser and of an output of 3 W and the light source composed of the array including 10 lasers and of an output of 30 W were applied to evaluate the illumination light. The results of the evaluation of the devices were shown in table 4.

TABLE 4

| | | |
|---|---|---|
| Area of incident face 2 | | 22500 μm² |
| Area of emitting face 3 | | 504100 μm² |
| Area of emitting face 3/Area of incident face 2 | | 22.4 |
| Thickness of phosphor element 1 | | 400 μm |
| θ | | 35° |
| Output power of Excitation light 3 W | Output power of white light | 800 1 m |
| | Unevenness of brightness | Observed |
| | Color unevenness | Observed |
| Output power of Excitation light 30 W | Output power of white light | 2400 1 m |
| | Unevenness of brightness | Observed |
| | Color unevenness | None |

As can be seen from the results, according to the inventive examples 1, 2 and 3, when the excitation light is made incident onto the phosphor device to generate the fluorescence, it is possible to improve the fluorescence intensity of the emitted light and to suppress the color unevenness of the emitted white light. Further, by providing the curved part in the outer peripheral part of the incident face as described in the inventive example 2, or by providing a plurality of the inclination regions as described in the inventive example 3, it is possible to suppress the unevenness of the brightness of the emitted white light. The output power of the white light is further improved in the inventive example 3.

The invention claimed is:

1. A phosphor element comprising an incident face for an excitation light, an emitting face opposing said incident face and a side face, said phosphor element converting at least a part of said excitation light incident onto said incident face into a fluorescence and emitting said fluorescence from said emitting face:

wherein said emitting face has a convex shape and an area greater that an area of said incident face;

wherein said phosphor element comprises an inclination region in which an inclination angle of said side face with respect to a vertical axis perpendicular to said emitting face is monotonously increased from said incident face toward said emitting face, viewed in a cross-section perpendicular to said emitting face and along the longest dividing line halving said emitting face; and wherein said phosphor element comprises a plurality of said inclination regions along said side face.

2. The phosphor element of claim 1, wherein said inclination region reaches said emitting face.

3. The phosphor element of claim 1, wherein said inclination angle at an end of said inclination region on a side of said incident face and said inclination angle of said inclination region at an end on a side of said emitting face are different by 3° or larger and 45° or smaller.

4. The phosphor element of claim 1, wherein said inclination angle at an end of said inclination region on a side of said incident face is 20° or larger and 62° or smaller.

5. The phosphor element of claim 1, wherein said inclination angle at an end of said inclination region on a side of said emitting face is 23° or larger and 65° or smaller.

6. The phosphor element of claim 1, further comprising a curved part in an outer peripheral part of said incident face.

7. A phosphor device comprising:
the phosphor element of claim 1; and
a reflection film covering at least a part of said side face.

8. The phosphor device of claim 7, further comprising a low-refractive index layer present between said side face and said reflection film.

9. The phosphor device of claim 7, further comprising a heat dissipation substrate present on said side face of said phosphor element, said heat dissipation substrate comprising a metal having a thermal conductivity of 200 W/mK or larger.

10. An illumination apparatus comprising a light source oscillating a laser light and the phosphor element of claim 1.

11. The illumination apparatus of claim 10, further comprising a reflection film covering at least a part of said side face.

12. The illumination apparatus of claim 10, further comprising a low refractive index layer present between said side face and said reflection film.

13. The illumination apparatus of claim 10, further comprising a heat dissipation substrate present on said side face of said phosphor element, said heat dissipation substrate comprising a metal having a thermal conductivity of 200 W/mK or larger.

14. The phosphor element of claim 1, wherein the plurality of said inclination regions have differing inclination angles.

* * * * *